United States Patent
Kishida

(10) Patent No.: US 9,694,806 B2
(45) Date of Patent: Jul. 4, 2017

(54) POWER GENERATION CONTROL DEVICE OF HYBRID VEHICLE

(71) Applicant: FUJI JUKOGYO KABUSHIKI KAISHA, Tokyo (JP)

(72) Inventor: Taichi Kishida, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 210 days.

(21) Appl. No.: 14/224,831

(22) Filed: Mar. 25, 2014

(65) Prior Publication Data

US 2014/0297077 A1 Oct. 2, 2014

(30) Foreign Application Priority Data

Mar. 27, 2013 (JP) .................................. 2013-065706

(51) Int. Cl.
| | | |
|---|---|---|
| *B60W 20/00* | (2016.01) | |
| *B60W 10/10* | (2012.01) | |
| *B60W 10/06* | (2006.01) | |
| *B60W 20/13* | (2016.01) | |

(52) U.S. Cl.
CPC ............ *B60W 10/10* (2013.01); *B60W 10/06* (2013.01); *B60W 20/13* (2016.01); *B60W 2550/308* (2013.01); *B60W 2710/0666* (2013.01); *Y10S 903/93* (2013.01)

(58) Field of Classification Search
CPC .. B60K 31/0008; B60W 20/102; B60W 10/06
USPC ................... 701/93, 96; 180/169; 123/198 F
See application file for complete search history.

(56) References Cited

U.S. PATENT DOCUMENTS

| | | | | |
|---|---|---|---|---|
| 5,529,139 A | * | 6/1996 | Kurahashi et al. | ........... 180/169 |
| 6,259,395 B1 | * | 7/2001 | Adachi et al. | ................... 342/70 |
| 6,332,108 B1 | * | 12/2001 | Hirasago | ......................... 701/93 |
| 6,339,740 B1 | * | 1/2002 | Seto et al. | ...................... 701/96 |
| 6,370,470 B1 | * | 4/2002 | Yamamura et al. | ............ 701/96 |
| 7,266,453 B2 | * | 9/2007 | Sawamoto | ............. G08G 1/166 340/435 |
| 2002/0044047 A1 | * | 4/2002 | Miyakoshi et al. | .......... 340/435 |
| 2002/0087255 A1 | * | 7/2002 | Jindo et al. | ...................... 701/96 |
| 2002/0134602 A1 | * | 9/2002 | Kobayashi et al. | .......... 180/169 |
| 2003/0028311 A1 | * | 2/2003 | Seto | ................... B60K 31/0008 701/96 |
| 2004/0231634 A1 | * | 11/2004 | Sen et al. | .................. 123/198 F |

(Continued)

FOREIGN PATENT DOCUMENTS

| | | |
|---|---|---|
| JP | 09-298802 A | 11/1997 |
| JP | 2006-143141 A | 6/2006 |

(Continued)

*Primary Examiner* — Thomas G Black
*Assistant Examiner* — Wae Louie
(74) *Attorney, Agent, or Firm* — McDermott Will & Emery LLP

(57) ABSTRACT

A hybrid vehicle has an engine and a motor-generator as power sources and has an inter-vehicle distance detection unit to detect an inter-vehicle distance between the vehicle and a preceding vehicle. A power generation amount is restricted according to the inter-vehicle distance in a power generation travel mode in which power of the engine drives the motor-generator while being transferred to the drive wheels. Output torque of an engine drivetrain is reduced according to the restricted power generation amount.

16 Claims, 4 Drawing Sheets

(56) References Cited

U.S. PATENT DOCUMENTS

| | | | |
|---|---|---|---|
| 2009/0039702 A1* | 2/2009 | Nishino et al. | 303/114.1 |
| 2009/0281704 A1* | 11/2009 | Otake | 701/96 |
| 2009/0312889 A1* | 12/2009 | Krupadanam | B60L 11/1859 701/1 |
| 2013/0204472 A1* | 8/2013 | Pfefferl | B60T 1/10 701/22 |
| 2013/0253750 A1* | 9/2013 | Otake | B60W 10/06 701/22 |
| 2014/0067225 A1* | 3/2014 | Lee | B60W 50/0097 701/93 |
| 2014/0297077 A1* | 10/2014 | Kishida | B60W 10/06 701/22 |
| 2015/0314775 A1* | 11/2015 | Dextreit | B60W 20/19 701/22 |

FOREIGN PATENT DOCUMENTS

| | | |
|---|---|---|
| JP | 2007-008255 A | 1/2007 |
| JP | 2007-129827 A | 5/2007 |
| JP | 2007-168502 A | 7/2007 |
| JP | 2009-189217 A | 8/2009 |
| JP | 2009-274611 A | 11/2009 |

\* cited by examiner

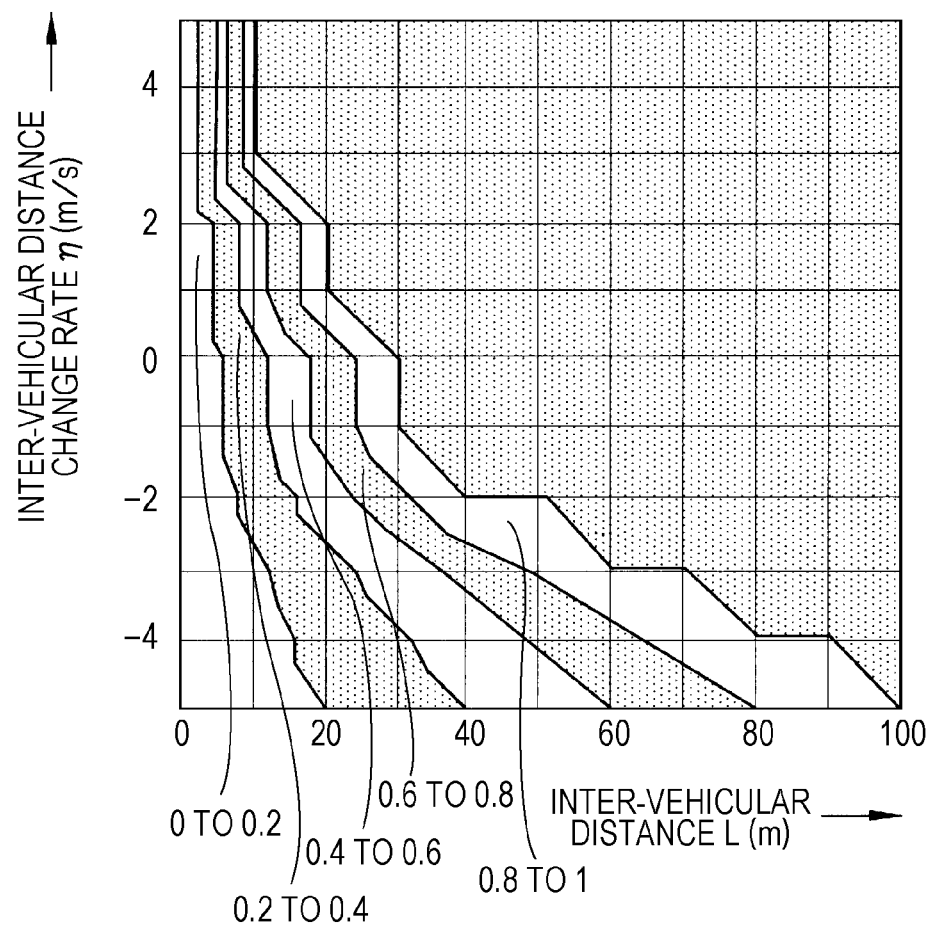

POWER GENERATION CONTROL DEVICE OF HYBRID VEHICLE

CROSS-REFERENCE TO RELATED APPLICATIONS

The present application claims priority from Japanese Patent Application No. 2013-065706 filed on Mar. 27, 2013, the entire contents of which are hereby incorporated by reference.

BACKGROUND

1. Technical Field

The present invention relates to a power generation control device of a hybrid vehicle including a motor having an electric power generation function and an engine as power sources.

2. Related Art

In some hybrid vehicles having an internal-combustion engine and a motor as power sources, the motor has an electric power generation function. Japanese Unexamined Patent Application Publication (JP-A) No. H9-298802 discloses a hybrid vehicle having an engine that drives front wheels and a motor-generator that drives rear wheels. In this hybrid vehicle, and electric energy generated by regenerative braking of the motor-generator is stored in a battery when the speed of the vehicle is reduced.

JP-A No. 2007-168502 discloses a power-split hybrid vehicle having a drivetrain in which an engine and a motor are connected to each other via a power distribution mechanism, and an generator is connected to the power distribution mechanism to store the electric energy generated by regenerative braking in a battery. JP-A No. 2009-189217 discloses a power-split hybrid vehicle including a three-shaft-type power distribution mechanism connected with a crankshaft of an engine, a first motor-generator connected with the power distribution mechanism, and a second motor-generator connected with a ring gear shaft of the power distribution mechanism. In this hybrid vehicle, both motor-generators function as a motor and a generator.

JP-A No. 2009-274611 discloses a parallel hybrid vehicle which has an engine and a power-generatable motor directly connected with the engine. In this hybrid vehicle, power generated by both the engine and motor is transmitted to drive wheels via a transmission. The electric energy generated by the motor is stored in a battery during regenerative braking.

These hybrid vehicles following modes: a travel mode in which the vehicle travels using drive force output from at least one of the engine and the motor-generator; a charge mode in which electric energy of the generator is stored in the battery when the vehicle speed is reduced; and a power generation travel mode in which the vehicle generates power while traveling.

If a vehicle has an inter-vehicle distance detection unit, an inter-vehicle distance from the vehicle to a preceding vehicle and an target such as an obstacle can be detected. The above-described hybrid vehicles include an inter-vehicle distance sensor to detect the inter-vehicle distance. In JP-A No. H9-298802, an increase of the vehicle speed is restricted by regenerative braking of the motor-generator when the vehicle is traveling and a brake request is detected, and an approach to the obstacle is restricted by regenerative braking of the motor-generator when an obstacle is detected ahead.

In JP-A No. 2007-168502, an inter-vehicle distance between the vehicle and the preceding vehicle is maintained, and a distribution ratio of a drive force that the motor shares is set higher regarding a requested drive force when information requesting a drive force of a higher responsiveness is indicated. Further, in JP-A No. 2009-189217, during low-speed traveling to follow the preceding vehicle, motor regenerative braking is performed within a range of requested braking torque when the vehicle speed is equal to or larger than a predetermined vehicle speed, and braking torque of the motor, which is regenerative torque, is replaced with a braking force by the brake when the vehicle speed is less than the predetermined vehicle speed based on the vehicle speed and the inter-vehicle distance. Further, in JP-A No. 2009-274611, an expected regenerative amount is calculated based on a relative speed change calculated from vehicle speeds of the vehicle and the preceding vehicle, and a target SOC of the energy storage device is changed based on the expected regenerative amount.

The above-described conventional hybrid vehicles have a power generation travel mode. When the vehicle travels in the power generation travel mode, the engine load has to be increased more than the torque transferred to the drive wheels in order to generate power, and fuel consumption increases. Thus, the power generation travel mode can be a disadvantageous travel mode in view of fuel economy. However, without the motor power generation travel, the state of charge of the battery reduces and it can be difficult to travel as transferring motor torque to the drive wheels.

On the other hand, when the brake is operated while traveling in the power generation travel mode, the travel mode is switched to the regenerative braking mode and electric energy generated by the motor-generator, generator, and the like is charged in the battery. However, in the power generation travel mode of the conventional hybrid vehicles, the power generation amount is constant. When the power generation amount is constant and power generation is performed by the engine as transferring the power of the engine to the drive wheels, this deteriorates instantaneous fuel economy.

BRIEF SUMMARY OF THE INVENTION

The present invention has an object to improve fuel economy of a hybrid vehicle having a power generation travel mode.

An aspect of the present invention provides a power generation control device of a hybrid vehicle including, as power sources, an engine and a motor having an electric power generation function, the power generation control device including: an inter-vehicle distance detection unit configured to detect an inter-vehicle distance between the vehicle and a preceding vehicle; and a power generation control unit configured to restrict a power generation amount according to the inter-vehicle distance to reduce an engine load during a power generation travel in which power of the engine drives the motor while being transferred to a drive wheel.

BRIEF DESCRIPTION OF THE DRAWINGS

FIG. 3 is a chart illustrating motor torque gain to perform a power generation restriction process corresponding to inter-vehicle distances and inter-vehicle distance change amounts.

DETAILED DESCRIPTION

Figure 1:
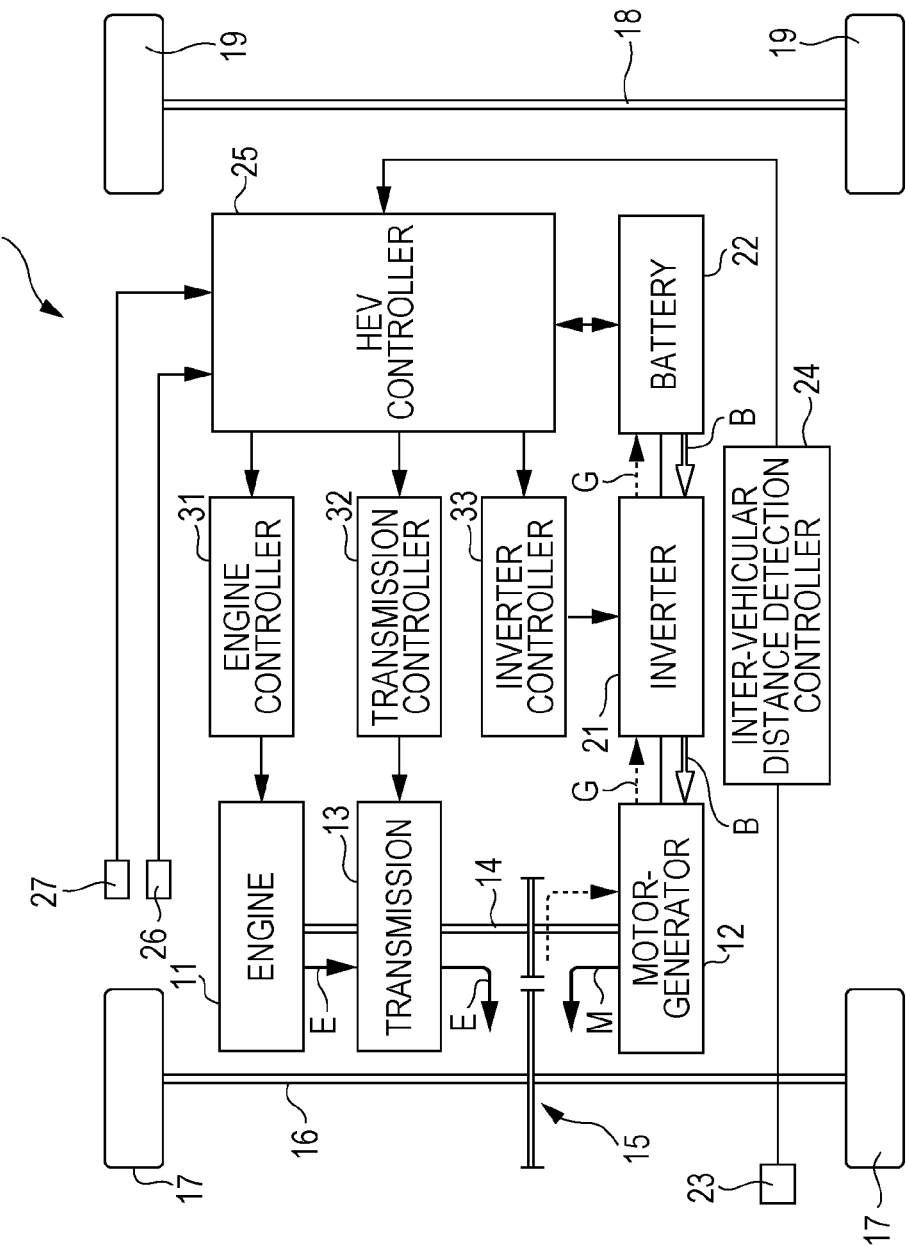
FIG. 1 is a diagrammatic diagram illustrating an example of a system configuration of a hybrid vehicle.

An implementation of the present invention will be explained in detail below with reference to the drawings. A hybrid vehicle 10 illustrated in FIG. 1 has, as power sources, an engine 11 which is an internal-combustion engine such as a gasoline engine and a diesel engine, and a motor-generator 12 which is a motor with an electric power generation function. An output shaft of the engine 11 is connected with a transmission 13 and a motor-generator 12 is connected with an output shaft 14 of the transmission 13. The output shaft 14 is connected with a front wheel axle 16 via a speed reduction gear pair 15. The hybrid vehicle 10 employs a parallel system, that is, the hybrid vehicle 10 has an engine drivetrain for transferring power of the engine 11 to the front wheels 17 serving as drive wheels and a motor drivetrain for transferring power of the motor-generator 12 to the drive. The front wheels 17 provided to the axle 16 receive at least either one of the power of the engine 11 and the power of the motor-generator according to a travel mode. A rear wheel axle 18 is provided with rear wheels 19. In FIG. 1, a differential gear provided to the front wheel axle 16 is not illustrated.

In the hybrid vehicle 10 illustrated in FIG. 1, the engine 11 drives the wheels and motor-generator 12 to generate electric power while the motor-generator 12 is also used as a power source for driving. An inverter 21 is connected with a stator of the motor-generator 12. The inverter 21 is connected to a battery 22 as an energy storage device via a power distribution line. In the hybrid vehicle 10, power from the engine 11 is transferred to the front wheels 17 as indicated by arrows E, electric power from the battery 22 is supplied to the motor-generator 12 as indicated by arrows B, and power from the motor-generator 12 is transferred to the front wheels 17 as indicated by arrows M. With this configuration, the vehicle can be driven by using, as a power source, at least either one of the engine 11 and the motor-generator 12.

The motor-generator 12 functions as an electricity generator when a vehicle speed is reduced, whereby the travel mode is switched to the regenerative braking mode in which braking energy discarded as thermal energy upon braking is absorbed and stored in the battery 22, as indicated by dashed arrows G. Further, the hybrid vehicle 10 has a power generation travel mode in which a load of the engine 11 is increased to transfer a travel output to the drive wheels as well as the motor-generator 12 uses an excess output to generate electric power.

The hybrid vehicle 10 has an inter-vehicle distance detection unit 23 for detecting an inter-vehicle distance between the hybrid vehicle 10 and a preceding vehicle. The inter-vehicle distance detection unit 23 is configured with, for example, with two CCD cameras for detecting the distance to the preceding vehicle as a target based on left and right parallax images. Alternatively, the inter-vehicle distance detection unit 23 may be configured with a millimeter-wave radar for detecting the distance. Regarding a detection sensor signal from the inter-vehicle distance detection unit 23, the inter-vehicle distance between the vehicle and the preceding vehicle and an inter-vehicle distance change amount are detected based on the detection sensor signal in an inter-vehicle distance detection controller 24 serving as the inter-vehicle distance detection unit and the inter-vehicle distance change amount detection unit of the present invention. The signal of the detected inter-vehicle distance and inter-vehicle distance change amount is sent to an HEV controller 25 serving as the power generation control unit of the present invention. The HEV controller 25 receives an accelerator operation signal from an accelerator 26 and a brake operation signal from a brake 27. As the brake 27, there are a brake operated by being pressed by a driver and an automatic brake if the vehicle is made to apply a braking force according to the inter-vehicle distance.

The HEV controller 25 transmits a control signal to an engine controller 31 which controls the engine 11, and output torque of the engine 11 is controlled. The HEV controller 25 further outputs a transmission command signal to a transmission controller 32 which controls the transmission 13 and a command signal of the output torque of the motor-generator 12 to an inverter controller 33 which controls the inverter 21. The HEV controller 25 has a function for detecting a state of charge (SOC) of the battery 22. The above various controllers including the HEV controller 25 are composed of a microcomputer having a central processing unit (CPU), a memory (ROM, RAM) and an input-output interface.

Figure 2A:
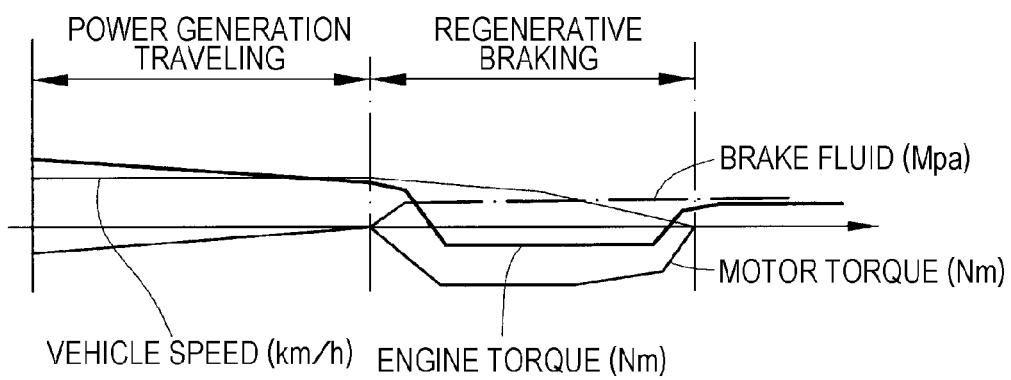
FIG. 2A is a timing diagram illustrating a power generation control in a power generation travel mode according to an implementation of the present invention.
Figure 2B:
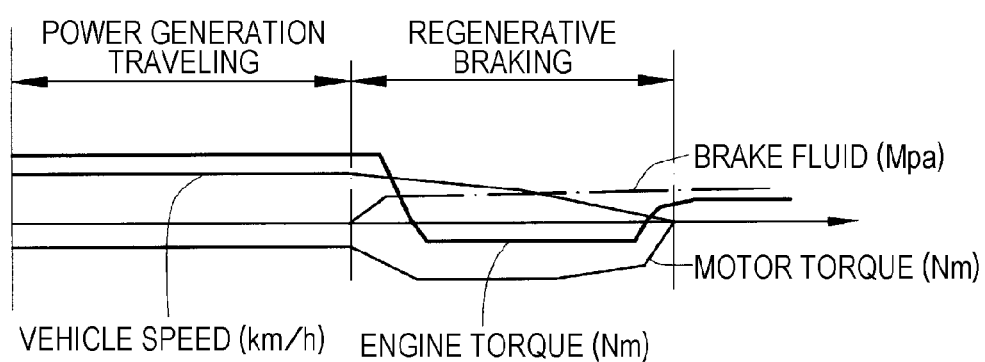
FIG. 2B is a timing diagram illustrating a conventional power generation control given as a comparative example.

FIG. 2A is a timing diagram illustrating a power generation control in the power generation travel mode according to the implementation of the present invention; and FIG. 2B is a timing diagram illustrating a conventional power generation control given as a comparative example. In FIGS. 2A and 2B, the power generation travel mode and the regenerative braking mode are illustrated. The travel mode is switched to the regenerative braking mode when the vehicle approaches to a preceding vehicle and the driver operates the brake 27. In the case that an automatic brake system is installed, when the vehicle approaches to the preceding vehicle at a predetermined distance, the automatic brake system is activated and the travel mode is automatically switched to the regenerative braking mode.

In the power generation travel mode, the output torque of the engine 11 is transferred to the motor-generator 12 as well as the drive wheels and the motor-generator 12 generates power. As illustrated in FIG. 2A, while traveling in the power generation travel mode, a power generation amount in the power generation travel mode is restricted based on the inter-vehicle distance, or the inter-vehicle distance and inter-vehicle distance change amount.

As illustrated as the comparative example in FIG. 2B, conventionally, until the travel mode is switched to the regenerative braking mode, the power generation amount in the power generation travel mode is set constant. On the other hand, as illustrated in FIG. 2A, when the power generation amount in the power generation travel mode is restricted based on the inter-vehicle distance and the like, the power generation amount is restricted before the travel mode is switched to the regenerative braking mode. This results in an improvement of fuel economy of the hybrid vehicle 10.

FIG. 3 is a chart illustrating motor torque gain used to perform a power generation restriction process by the power generation control device according to the inter-vehicle distance and the inter-vehicle distance change amount. This chart is stored in a memory provided in either one of the inter-vehicle distance detection controller 24 and the HEV controller 25.

In FIG. 3, the horizontal axis represents the inter-vehicle distances L (m), and the vertical axis represents the inter-vehicle distance change amount (m) per unit time (second), which is the inter-vehicle distance change rate η (m/s). When the inter-vehicle distance L is from 100 to 80 m, the motor torque gain K is set from 0.8 to 1, and, when the inter-vehicle distance is from 80 to 60 m, the gain K is set from 0.8 to 0.6. The gain K is set to be smaller as the inter-vehicle distance L becomes smaller, as illustrated in FIG. 3. Further, the gain K is set to be smaller when the inter-vehicle distance change rate (m/s) becomes negatively larger, in other words, the inter-vehicle distance change rate becomes larger in a direction approaching the preceding vehicle.

In the power generation travel mode, as illustrated in FIG. 2, the target engine torque (Nm) of the engine 11 set to a value which is obtained by adding a negative target motor torque (Nm) for a power generation by the motor-generator 12 to the engine torque for traveling to be transferred to the drive wheels, and the transmission gear ratio is also set to a target transmission gear ratio in the power generation travel mode. In this travel mode, the inter-vehicle distance L and the inter-vehicle distance change rate η are calculated by the inter-vehicle distance detection controller 24 based on a detection signal from the inter-vehicle distance detection unit 23. The negative target motor torque restriction process of the motor-generator 12 is performed by setting motor torque gain K and multiplying the gain K to the target motor torque (Nm), as illustrated in the chart data of FIG. 3, based on the inter-vehicle distance L and the inter-vehicle distance change rate η. With this configuration, the power generation amount is restricted in the power generation travel mode, whereby the fuel economy can be improved.

When the negative target motor torque restriction process is performed, the output torque of the drivetrain for the drive wheels becomes larger than to a driver's requested drive force. Thus, as illustrated in FIG. 2A, to maintain the output torque of the drivetrain to be the driver's requested drive force, an engine load is reduced by subtracting the amount of target motor torque restriction from the target engine torque. In order to subtract output torque of the engine drivetrain, instead of subtracting the target engine torque to reduce the engine load the transmission gear ratio may be adjusted to reduce the engine load, as long as the driver's requested drive force is maintained. Further, both of the subtraction of the target engine torque and the adjustment of the transmission may be performed.

Figure 4:
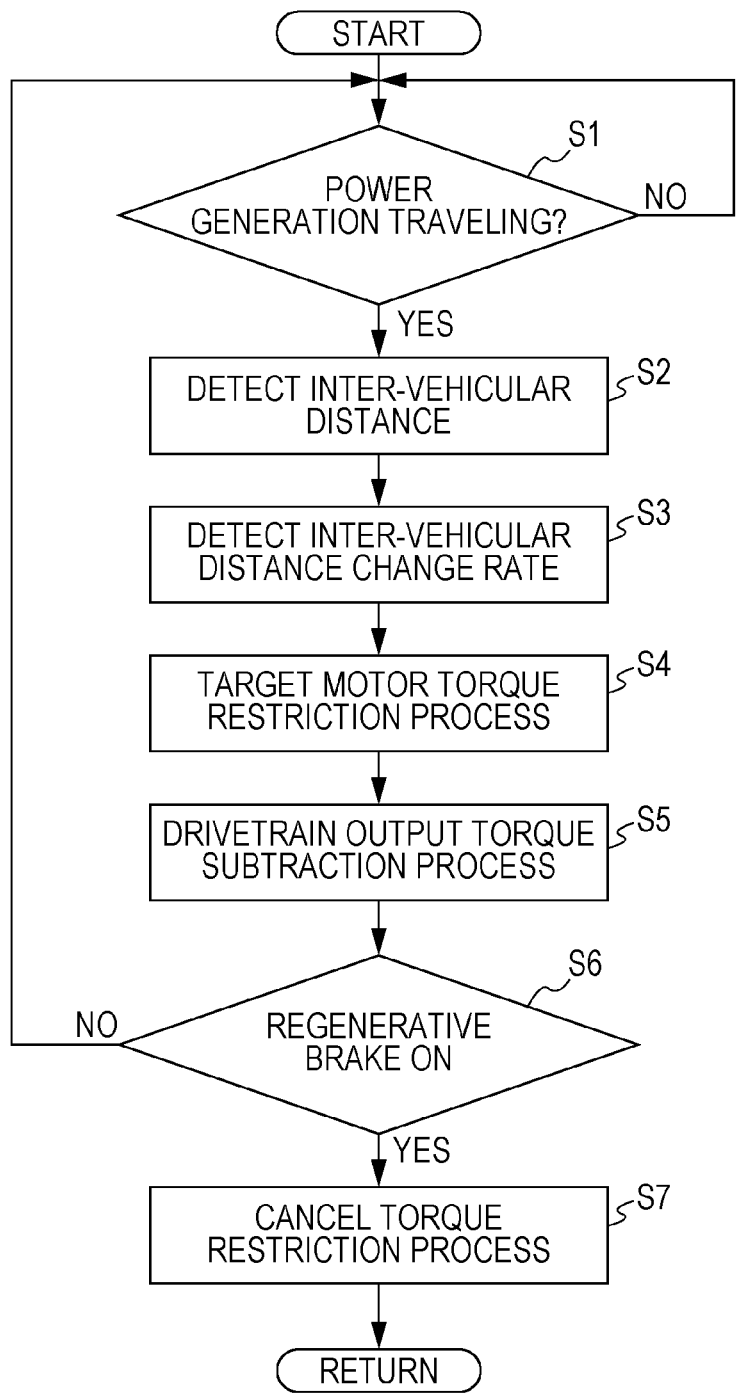
FIG. 4 is a flowchart illustrating an algorithm of a power generation restriction process of the power generation control device according to the implementation of the present invention.

FIG. 4 is a flowchart illustrating an algorithm of the power generation restriction process of the power generation control device. When it is determined, in step S1, that the power generation travel mode is being executed, the inter-vehicle distance L and the inter-vehicle distance change rate η are detected based on the detection signal from the inter-vehicle distance detection unit 23 (steps S2 and S3). As illustrated in FIG. 3, when the inter-vehicle distance L becomes equal to or less than 100 m, the motor torque gain K is set to be equal to or less than 1 and the target motor torque restriction process of is executed in step S4. The restriction process may be executed based on only the inter-vehicle distance L; however, the restriction process that can further improve fuel economy by using both inter-vehicle distance L and inter-vehicle distance change rate η. Note that, even when the power generation travel mode is being executed, the target motor torque restriction process is not performed if the state of charge (SOC) of the battery 22 is equal to or lower than a predetermined value.

When the target motor torque restriction process is executed, a subtraction process of output torque of the drivetrain is executed in step S5. In this subtraction process in step S5, as described above, a method for extracting the target engine torque, a method for adjusting the transmission gear ratio, or a method for performing both of the target engine torque extraction and the transmission adjustment is performed to maintain the driver's requested drive force. When the driver operates the brake or the automatic brake is activated, the mode is switched to the regenerative braking mode and the torque restriction process is canceled (steps S6 and S7).

According to the above-described implementation, the engine load for power generation is lowered by restricting the power generation amount according to the inter-vehicle distance between the vehicle and a preceding vehicle when traveling in the power generation travel mode, whereby fuel economy of the hybrid vehicle can be improved.

The present invention is not limited to the aforesaid implementations, and various modifications are possible without departing from the scope of the present invention. For example, while the hybrid vehicle 10 in FIG. 1 employs a parallel system, the present invention is not limited to this and can be applied to a power-split hybrid vehicle.

The invention claimed is:

1. A power generation control device of a hybrid vehicle including, as power sources, an engine and a motor having an electric power generation function, the power generation control device comprising:
   an inter-vehicle distance detector configured to detect an inter-vehicle distance between the vehicle and a preceding vehicle; and
   a controller configured to restrict a power generation amount from the motor by lowering an engine load in relation to a reduction of the inter-vehicle distance, during a power generation travel where a power of the engine drives the motor while being transferred to a drive wheel and before regenerative braking caused by a braking operation for deceleration is activated.

2. The power generation control device of a hybrid vehicle according to claim 1, wherein the engine load is reduced by lowering engine torque.

3. The power generation control device of the hybrid vehicle according to claim 2, even during the power generation travel, the restriction of power generation amount is prohibited if the state of charge of a battery is equal to or lower than a predetermined value.

4. The power generation control device of the hybrid vehicle according to claim 1, wherein the engine load is reduced by adjusting a transmission gear ratio.

5. The power generation control device of the hybrid vehicle according to claim 4, even during the power generation travel, the restriction of power generation amount is prohibited if the state of charge of a battery is equal to or lower than a predetermined value.

6. The power generation control device of the hybrid vehicle according to claim 1, wherein the engine load is reduced by lowering engine torque and adjusting a transmission gear ratio.

7. The power generation control device of the hybrid vehicle according to claim 6, even during the power generation travel, the restriction of power generation amount is prohibited if the state of charge of a battery is equal to or lower than a predetermined value.

8. The power generation control device of the hybrid vehicle according to claim 1, even during the power generation travel, the restriction of power generation amount is prohibited if the state of charge of a battery is equal to or lower than a predetermined value.

9. A power generation control device of a hybrid vehicle including, as power sources, an engine and a motor having an electric power generation function, the power generation control device comprising:
   an inter-vehicle distance detector configured to detect an inter-vehicle distance between the vehicle and a preceding vehicle;
   a controller configured to restrict a power generation amount from the motor by lowering an engine load as the inter-vehicle distance reduces, during a power generation travel in which regenerative braking is not activated yet and power of the engine drives the motor while being transferred to a drive wheel; and
   an inter-vehicle distance change amount detector configured to detect an inter-vehicle distance change amount between the vehicle and the preceding vehicle, wherein the power generation amount is restricted according to the inter-vehicle distance and the inter-vehicle distance change amount.

10. The power generation control device of a hybrid vehicle according to claim 9, wherein the engine load is reduced by lowering engine torque.

11. The power generation control device of the hybrid vehicle according to claim 10, even during the power generation travel, the restriction of power generation amount is prohibited if the state of charge of a battery is equal to or lower than a predetermined value.

12. The power generation control device of the hybrid vehicle according to claim 9, wherein the engine load is reduced by adjusting a transmission gear ratio.

13. The power generation control device of the hybrid vehicle according to claim 12, even during the power generation travel, the restriction of power generation amount is prohibited if the state of charge of a battery is equal to or lower than a predetermined value.

14. The power generation control device of the hybrid vehicle according to claim 9, wherein the engine load is reduced by lowering engine torque and adjusting a transmission gear ratio.

15. The power generation control device of the hybrid vehicle according to claim 14, even during the power generation travel, the restriction of power generation amount is prohibited if the state of charge of a battery is equal to or lower than a predetermined value.

16. The power generation control device of the hybrid vehicle according to claim 9, even during the power generation travel, the restriction of power generation amount is prohibited if the state of charge of a battery is equal to or lower than a predetermined value.

* * * * *